July 16, 1963

H. GOLDSCHMIDT 3,097,435

SELF TESTING DEVICE

Filed Oct. 10, 1961

INVENTOR.

Hans Goldschmidt

BY

Attorneys

July 16, 1963 H. GOLDSCHMIDT 3,097,435
SELF TESTING DEVICE
Filed Oct. 10, 1961 4 Sheets-Sheet 2

INVENTOR.
Hans Goldschmidt
BY
Attorneys

July 16, 1963 H. GOLDSCHMIDT 3,097,435
SELF TESTING DEVICE
Filed Oct. 10, 1961 4 Sheets-Sheet 3

INVENTOR.
Hans Goldschmidt
BY
Attorneys

July 16, 1963     H. GOLDSCHMIDT     3,097,435
SELF TESTING DEVICE
Filed Oct. 10, 1961     4 Sheets-Sheet 4
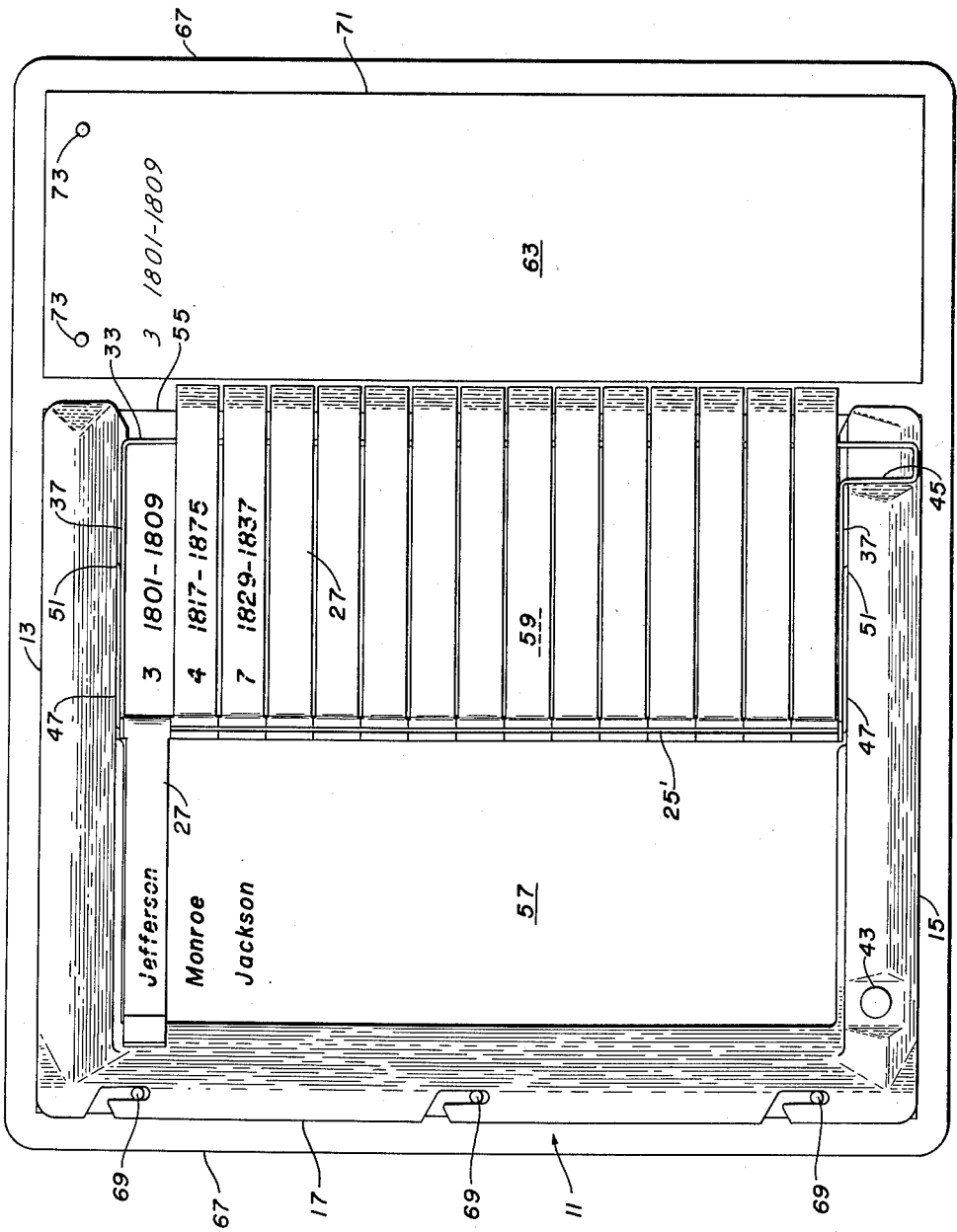
Fig. 10.
INVENTOR.
Hans Goldschmidt.
BY
Attorneys.

United States Patent Office 3,097,435
Patented July 16, 1963

3,097,435
SELF TESTING DEVICE
Hans Goldschmidt, 1 Flood Circle, Atherton, Calif.
Filed Oct. 10, 1961, Ser. No. 144,225
12 Claims. (Cl. 35—8)

This invention relates to a self teaching device and more particularly to a device to facilitate learning by the memory method.

With many of the subjects a school student must learn, a primary portion of the learning is memory. This is especially true in geography and history where names and dates must be memorized. In arithmetic, multiplication and division tables must be memorized. While the subjects mentioned are merely exemplary, it is well known that a great variety of subjects require extensive memory work.

In order to facilitate the memory work a repetitious review of the required subject matter is recommended. The repetitious review may include the formulation of a number of questions with the appropriate answers. The questions and answers may be in the form of preprinted sheets; or alternatively, and perhaps with more success, the questions and answers may be devised and prepared by the student himself. During the memory learning process the student reads the questions and first tries to answer them without assistance. After answering the question the student may check his answer with the correct answer. If his own answer to an individual question is in error, repetition is required until his answer is correct.

This is often done by students with cards having the questions on the front and the correct answers on the back. However, the cards required for a large number of questions creates an inconvenient package to be carried along with the books, loose leaf binders and other accouterments of school life.

It is a general object of this invention to provide an improved self testing device.

It is a more particular object of this invention to provide a self testing device which may be conveniently carried by a student along with books and other school supplies.

It is still another object of this invention to provide a self testing device which permits a student to test himself with a large number of questions, the answers to which may be hidden from view until the student has attempted the answers on his own merit.

It is still another object of this invention to provide a self testing device of the aforementioned character which may be used in conjunction with a loose leaf binder or with other devices designed for the particular purpose.

It is still another object of this invention to provide a self testing device which may have particular utility with questions of a two way nature such as states and capitols whereby the question may take the form of: given a capitol—name the state, or vice versa.

These and other objects and features of the invention will become more clearly apparent upon a review of the following description in conjunction with the accompanying drawing, in which:

FIGURE 10 is a plan view of the embodiment shown in FIGURES 7 and 8 but in use with an associated board.

Figure 1:
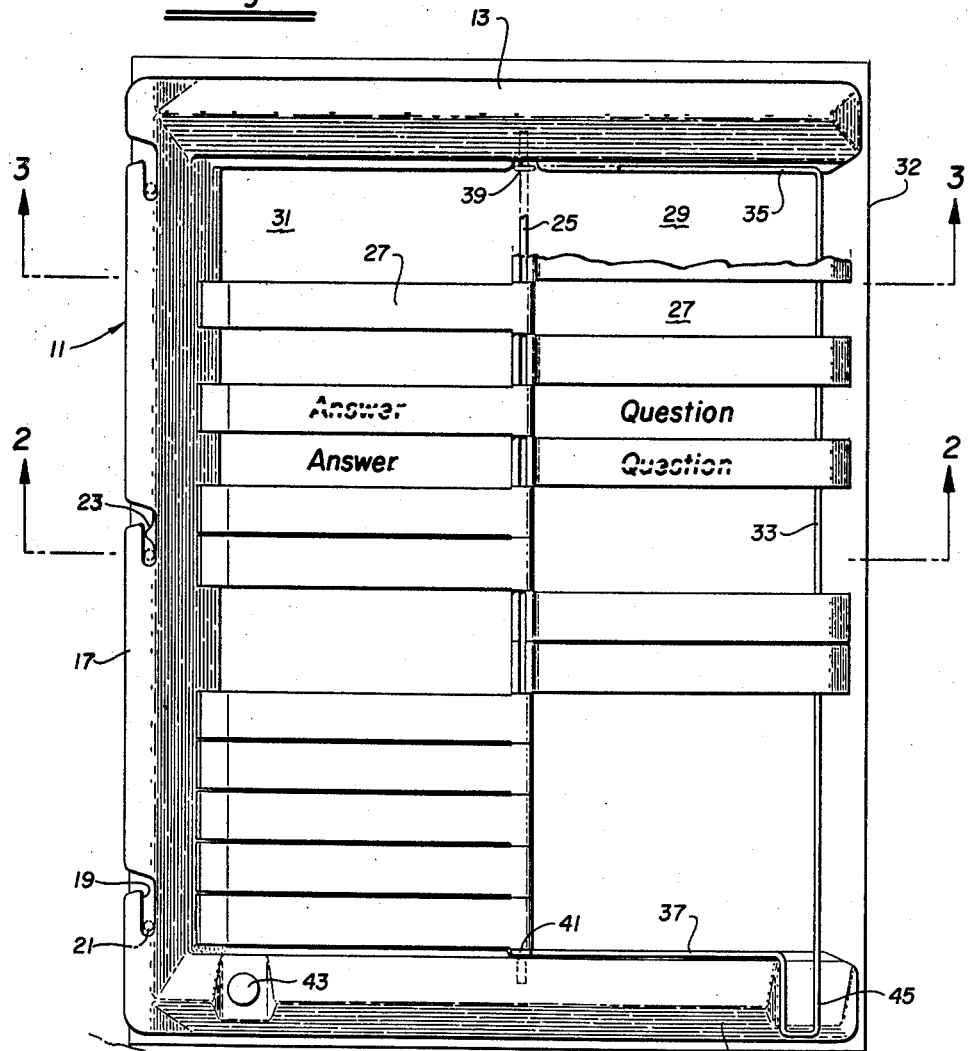
FIGURE 1 is a plan view of one embodiment of the invention showing flippers pivoted about a stationary rod.
Figure 2:
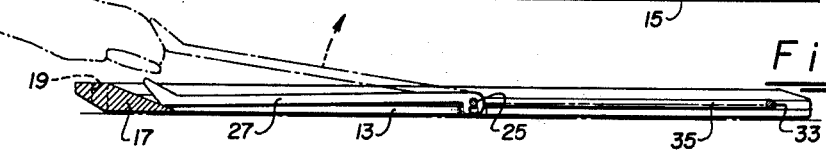
FIGURE 2 is a sectional view taken along the lines 2—2 of FIGURE 1.
Figure 3:
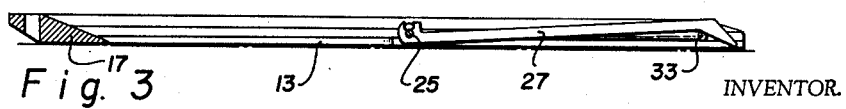
FIGURE 3 is a sectional view taken along the line 3—3 of FIGURE 1.

Referring to FIGURES 1 to 4 an embodiment of the invention is shown wherein a generally U-shaped frame member 11 includes upper and lower arms, 13 and 15 respectively, joined together by a third arm or cross member 17. The third arm 17 includes a plurality of L-shaped slots 19 which cooperate with the rings 21 of a loose leaf binder. One or more of the slots 19 may include a spring member 23 for resiliently retaining the frame 11 in close association with the loose leaf binder.

Figure 5:
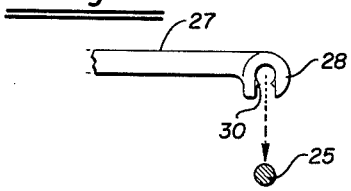
FIGURE 5 is an enlarged view showing the attachment of the flippers to the pivot rod.

Extending from the upper arm 13 to the lower arm 15 is a pivot rod 25 upon which are pivotally connected a plurality of flippers 27. As can be seen more clearly in FIGURE 5 the flippers 27 include a U-shaped clamp 28 at one end thereof. A pair of ribs 30 may be formed in the interior of the clamp 28. The clamp 28 and ribs 30 are slightly flexible whereby the ribs may be forced over the pivot rod 25 to pivotally retain the flipper 27 about the rod.

The pivot rod 25 may conveniently serve to divide the area enclosed by the frame 11 into a question area 29 to the right of the pivot rod 25 and an answer area 31 to the left of the pivot rod. Thus, an underlay 32 of questions and answers may be employed with the self testing device as shown in FIGURE 1 wherein a series of questions are disposed in the area 29 and the corresponding answers are disposed in an area 31.

Assuming all the flippers 27 are flipped to the left whereby the entire area 31 is covered, each of the questions in the area 29 will be exposed. For ease in operation the questions and the corresponding answers should be positioned such that only a single question is positioned under each flipper 27, when in its right hand position covering the area 29. Likewise, the corresponding answer should be positioned such that it underlies the same flipper when it is flipped to its left hand position covering the area 31. Alternatively, the questions and answers may underlie a plurality of flippers whereby more than one flipper must be flipped to reveal the proper answer. Moreover, the areas 29 and 31 may be answer and question areas respectively rather than vice versa.

As each question is answered correctly the flippers 27 may be switched to the right hand side of the pivot rod 25 to conceal the question. This flipping may be accomplished in the manner shown in FIGURE 2. After the lesson is complete and all of the questions have been answered properly the flippers may all be shifted to the left hand side of the pivot, either to start a new question and answer sheet or to store the device.

Figure 4:
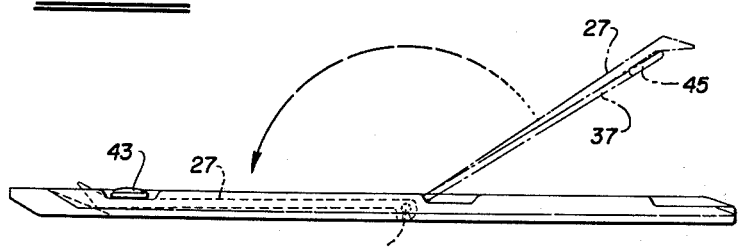
FIGURE 4 is an end view of the embodiment of FIGURE 1 showing the action of the flipping bar.

In order to provide quick flipping of all the flippers 27, a flipping bar 33 is provided which extends generally parallel to and for the full length of the pivot rod 25. A pair of arms 35 and 37 extend from the opposite ends of the flipping bar 33 generally parallel to each other and at right angles to the flipping bar 33 itself. The other end of each of the pair of arms is pivotally connected as at 39 and 41 to the pivot rod 25 itself. It is noted in FIGURES 1 and 4 that the lengths of the arms 35 and 37 are such that the flipping bar 33 is displaced from the pivot rod 25 a distance less than the length of the flippers 27. Thus, if the flipping bar 33 is pivoted in a counterclockwise direction about the rod 25 as shown in FIGURE 4 all of the flippers 27 will be simultaneously returned to the left hand side of the pivot rod 25.

Figure 6:
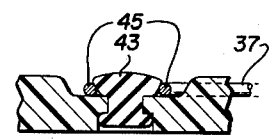
FIGURE 6 is a sectional view taken along the line 6—6 of FIGURE 7.

In order to facilitate storage of the self testing device, a latching mechanism (FIGURES 1, 6 and 7) is provided for cooperation with the flipping bar wherein all of the flippers 27 may be retained in their left hand position. This latching means includes a flexible detent 43 in the lower arm 15, and a cooperating portion 45 affixed to the flipper bar 33 itself. In the embodiment shown, the cooperating portion 45 includes a generally U-shaped configuration at the junction of the flipping bar 33 with the arm 37.

If desired a second flipping bar may be provided to simultaneously move all the flippers 27 to the right hand side of the pivot bar 25 and which may be especially advantageous with two directional questions such as states and their capitols.

Figure 7:
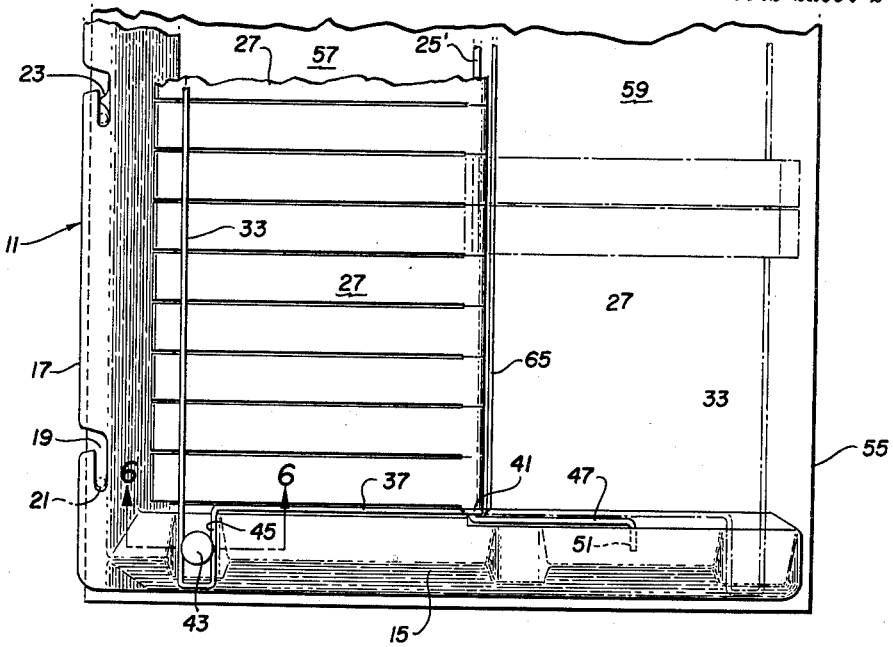
FIGURE 7 is a partial plan view of another embodiment of the invention wherein a plurality of flippers are pivoted about a shiftable rod.
Figure 8:
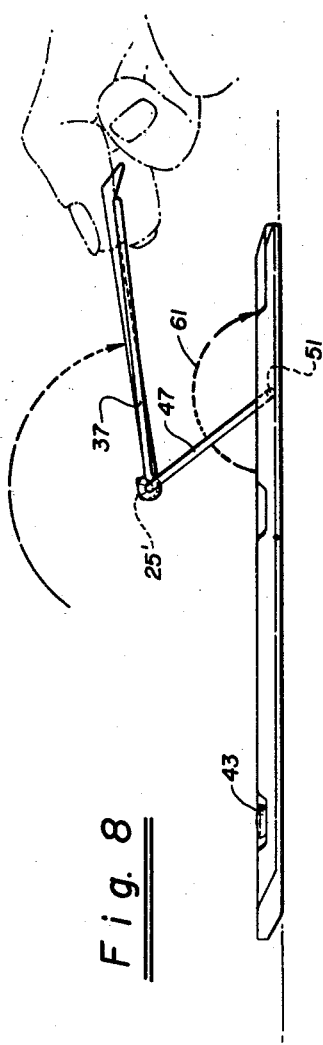
FIGURE 8 is an end view of the embodiment shown in FIGURE 7 illustrating the operation of the shifting bar.

Referring to FIGURES 7 and 8 another embodiment of the invention is shown which is somewhat similar to the embodiment shown in FIGURE 1 and includes the main frame 11 as well as a flipping bar 33 and a pivot rod 25'. The pivot rod 25' in the embodiment shown in FIGURE 7 is similar to the pivot rod 25 in the embodiment of FIGURE 1, but is not stationarily secured to the upper and lower arms 13 and 15. Rather the rod 25' has arms 47 joined at right angles to its ends. The other ends of the arms 47 are pivoted in the upper and lower arms 13 and 15 as at 51.

It is noted that the pivot rod 25', in the position as shown in FIGURE 7, is located in a substantially central position with respect to the upper and lower arms 13 and 15 thereby dividing an underlay sheet 55 into two areas 57 and 59. If desired, the area 59 may serve as a question area similar to the area 29 of FIGURE 1 and the area 57 may serve as an answer area similar to the area 31 of FIGURE 1.

Figure 9:
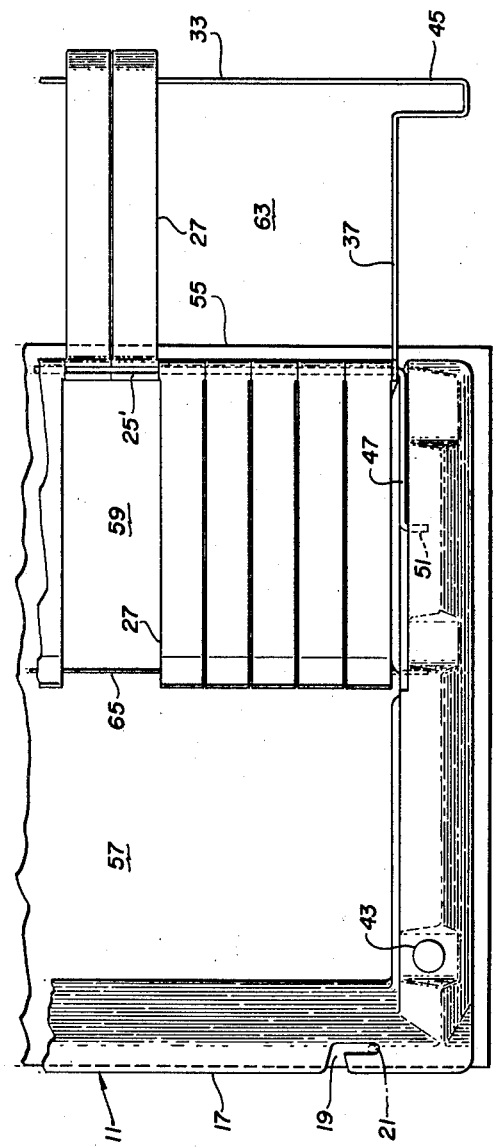
FIGURE 9 is a partial plan view of the embodiment of the invention shown in FIGURE 7 but shown in its extended position such that all questions may be in continuous view.

The pivot points 51 are located substantially in the center of the area 59. When the pivot rod 25' is rotated about the points 51 as shown in FIGURE 8 by the arrow 61, the pivot rod assumes a position as shown in FIGURE 9. Thus, a new, extended area 63 is provided abreast of the areas 57 and 59.

The area 63 need not be associated with any portion of the underlay 55 but may merely serve as a location for the flippers 27. Thus, referring to FIGURE 9, questions may be positioned in the area 57 and correct answers in the area 59. When during the course of study a student learns the correct answer, the flippers may be moved to the area 63 thereby revealing both the question and the answer rather than revealing only the answer as in the embodiment shown in FIGURE 1.

In the position of the device as shown in FIGURE 9 a flipper stop bar 65 is employed. The flipper stop bar is a stationary rod extending between the arms 13 and 15 in a line near the division of the areas 57 and 59. The stop bar 65 prevents the flippers 27 from rotating in a complete arc about the pivot rod 25' when the device is in the configuration shown in FIGURE 9. The flippers 27 would otherwise have a tendency to completely pivot about the rod 25' when the frame 11 is raised away from the underlay 55 as when the underlay sheets are being changed.

Moreover, the rod 65 lends rigidity to the frame 11 which is supplied in the embodiment of FIGURE 1 by the pivot rod 25 itself. However, it is obvious that the frame 11 may be constructed with sufficient rigidity to eliminate the need for any strengthening member. If the frame itself is sufficiently rigid and if, in the use of the device, complete pivotal movement of the flippers 27 about the rod 25' is acceptable, the rod 65 may be eliminated.

Referring to FIGURE 10 the embodiment of FIGURE 7 is shown with each of the areas 57, 59 and 63 being employed. In this instance the frame 11 is situated on a board 67 having pins 69 to position and retain the frame itself. It is noted that the board 67 is of greater width than the frame 11 whereby the area 63 is included on the board. In addition to the usual underlay sheet 55 beneath the frame 11, a second sheet or web 71 may be positioned on the board by means of the pins 73. Alternatively the web 71 may be a portion of a paper roll rotatably secured to the board in that area near the pin 73. Thus, it is seen that questions may be located in the area 57 with the correct answers in the areas 59. The sheet 71 may be employed by the student to write the answer he thinks is correct. After the student has written the answer he may move the flipper 27 from the right hand position in the area 59 to the left hand position in the area 57 whereby the correct answer is revealed.

Rather than being adjacent the frame 11, the writing sheet 71 may be displaced to the right whereby the area 63 is used only to receive the flippers. For this type of operation the device should be in the configuration shown in FIGURE 9 with the questions in the area 57, the correct answers in the area 59 and the writing sheet to the right of the flipping bar 33.

Conversely, the questions may be in the area 59 with the answers in the area 57 to provide the same type of self testing arrangement.

In order to study the entire list without first trying to prepare the correct answer the pivot rod 25' may be shifted to the right as shown in FIGURE 8 whereby the flippers 27 may all cover the area 63. In this instance both the questions and the answers in the areas 57 and 59 will be revealed for easy studying.

It is obvious that the broad scope of the invention may be accomplished with devices having structures much different than those described. The flippers could be pivotally attached to a pivot rod which is not connected to a U shaped frame. For instance, the pivot rod could be constructed with clamps for attachment to the top and/or bottom of a loose leaf binder cover or even to a clip board. In the case of a clip board, the clip itself could be used to retain the pivot rod.

Thus, it is seen that a new self testing device is provided in which a large number of questions may be accommodated and further which may be easily carried by the student along with other school supplies. It is apparent that the device may be used either in conjunction with a loose leaf binder or with a separate board designed for the particular purpose. It is further obvious that the invention is particularly useful with questions of a two way nature and that correct answers may be easily hidden from view until the student himself attempts to provide the correct answer.

I claim:

1. A self testing device for use with an underlay of question and answer paper, comprising a generally U-shaped frame having an upper and a lower arm joined together by a third arm fixed to one end of each of the upper and lower arms, a pivot rod connected between said upper and lower arms and extending substantially parallel to but spaced from the third arm whereby a series of questions on the underlay may be disposed on one side of the pivot rod and the associated answers on the other, and a plurality of flippers pivotally engaged on the rod whereby preselected ones or all of said answers may be hidden from view or disclosed at will.

2. A self testing device as defined in claim 1 together with a flipping bar extending generally parallel to the pivot rod, and pivoted thereabout, said flipping bar being displaced from said pivot rod a distance less than the length of said flippers whereby all of said flippers may be simultaneously flipped from one side of the pivot rod to the other.

3. A self testing device as defined in claim 2 together with latching means on said U-shaped frame member, said latching means comprising a flexible detent on one arm of the U-shaped frame member, and a U-shaped member integral with said flipping bar for selective cooperation with said flexible detent to retain the flipping bar in a position adjacent to the detent whereby the flippers may be held between the U-shaped frame and the flipping bar.

4. A self testing device as defined in claim 1 wherein said upper and lower arms extend across both the question and the answer portion of said overlay and said pivot rod is connected to the upper and lower arms intermediate the ends thereof.

5. A self testing device as defined in claim 4 wherein said flippers extend substantially to the ends of said upper and lower arms, together with a flipping bar extending generally parallel to and for the full length of said pivot rod, said flipping bar including a pair of arms having one end of each pivoted about opposite ends of the pivot rod, each of said pair of arms being of less length than the flippers and extending parallel with each other from and at right angles to the pivot rod.

6. A self testing device as defined in claim 4 wherein said pivot rod comprises a U-shaped member the ends of which are rotatably connected between said upper and lower arms, the legs of said pivot rod being substantially half the width of the question portion of the underlay.

7. A self testing device as defined in claim 6 together with a stop rod extending between said upper and lower arms at a point intermediate the ends of said arms.

8. A self testing device as defined in claim 6 together with a flipping bar extending generally parallel to the pivot rod and pivoted thereabout at a point remote to the rotatable connection of the pivot rod to the upper and lower arms, said flipping bar being displaced from said pivot rod a distance less than the length of said flippers whereby all of said flippers may be simultaneously moved from one side of the pivot rod to the other.

9. A self testing device comprising a loose leaf binder having a plurality of rings therein, an underlay of question and answer paper releasably retained in said loose leaf binder, a generally U-shaped frame having an upper and a lower arm joined together by a third arm affixed to one end of each of the upper and lower arms, said third arm being removably secured to the ring of said loose leaf binder, a pivot rod connected between said upper and lower arms and extending substantially parallel to but spaced from the third arm whereby a series of questions on the underlay may be disposed on one side of the pivot rod and the associated answers on the other, and a plurality of flippers pivotally engaged on the rod whereby preselected ones or all of said answers may be hidden from view or disclosed at will.

10. A self testing device comprising a board divided abreast into three approximately equal areas, whereby an underlay of question and answer paper may be placed over two adjacent ones of said areas and a second web of paper may be placed over the third of said areas, a generally U-shaped frame having upper and lower arms joined together by a third arm affixed to one end of each of the upper and lower arms, said U-shaped frame overlying said adjacent ones of the areas, a pivot rod connected between said upper and lower arms and extending substantially parallel to the third arm and spaced therefrom whereby a series of questions on the underlay may be disposed on one side of the pivot rod and the associated answers on the other, and a plurality of flippers pivotally engaged on the rod whereby a preselected one or all of said answers may be hidden from view or disclosed at will.

11. A self testing device as defined in claim 10 wherein said web of paper is secured by a plurality of pins on said board.

12. A self testing device for attachment to a relatively flat surface having an underlay of a question and answer sheet, comprising a pivot rod, a plurality of flippers pivotally mounted on said pivot rod, and means for retaining said pivot rod adjacent said surface and between the question and answer portions of said sheet.

References Cited in the file of this patent
UNITED STATES PATENTS

| | | |
|---|---|---|
| 627,836 | White | June 27, 1899 |
| 2,234,075 | Carolin | Mar. 4, 1941 |

FOREIGN PATENTS

| | | |
|---|---|---|
| 24,054 | Great Britain | Oct. 10, 1896 |
| 1,150,584 | France | Jan. 15, 1958 |